United States Patent [19]

Kobayashi et al.

[11] 4,433,079

[45] Feb. 21, 1984

[54] WATER-DISPERSION ADHESIVE FOR EXTRUSION LAMINATION

[75] Inventors: Noriyuki Kobayashi; Akihiko Funamoto, both of Chiba, Japan

[73] Assignee: Nippon Soda Company Limited, Tokyo, Japan

[21] Appl. No.: 473,698

[22] Filed: Mar. 9, 1983

[30] Foreign Application Priority Data

Mar. 19, 1982 [JP] Japan .................................. 57-43916

[51] Int. Cl.$^3$ .......................... C08G 59/18; C09J 3/16
[52] U.S. Cl. .................................... 523/404; 156/330; 523/402; 523/414; 525/407
[58] Field of Search ........................ 156/330; 525/407; 523/402, 404, 414

[56] References Cited

U.S. PATENT DOCUMENTS 4,345,004 8/1982 Miyata et al. ...................... 156/330

OTHER PUBLICATIONS

Chemical Abstracts, vol. 83, No. 20, Nov. 17, 1975, Abstract 165351s.
Chemical Abstracts, vol. 88, No. 12, Mar. 20, 1978, Abstract 74937z.
Chemical Abstracts, vol. 83, No. 20, Nov. 17, 1975, Abstract 165388j.

*Primary Examiner*—Ronald W. Griffin
*Attorney, Agent, or Firm*—George B. Oujevolk

[57] ABSTRACT

Water-dispersion adhesives stable in storage and dilution dispersion and excellent in adhesive properties for extrusion lamination which comprise a dispersion of a resin in water, wherein the resin (A) is obtained from a reaction of a polyepoxy compound (B) with a reaction mixture (C) of a polyethyleneimine (D) and a monoepoxy compound (E).

7 Claims, No Drawings

WATER-DISPERSION ADHESIVE FOR EXTRUSION LAMINATION

DETAILED EXPLANATION OF THE INVENTION

This invention relates to water-dispersion adhesives, suitable for melt-extrusion lamination.

Cellophane, paper, metal foil, plastic film, or the like, used as a base material, is coated with an adhesive for melt-extrusion lamination (hereinafter this is simply written an anchor coating agent), then plastic such as polyethylene or polypropylene is laminated by melt-extrusion to give composite film, which is widely used as a wrapping material.

Organic solvent type adhesives such as polyisocyanates or organic titanium compounds have been mainly used as the anchor coating agent conventionally. However, from the view point of safety and pollution as well as from the economical view point, water-based anchor coating agent has been investigated. There have been such water-based anchor coating agents as polyethyleneimines and their derivatives, methoxy methylol melamines, and acrylic and vinyl acetate emulsions. However, these agents do not necessarily have satisfactory properties, e.g. defects in physical properties such as moisture-proof, water-proof and limitation on use of kind of applied basic materials.

As for the water-based anchor coating agent obtained by reacting an epoxy compound and polyethylenemine or its derivative, Japanese Open Patent Publication No. 69148(1975) reported quality improvement by reacting a polyethyleneimine with epichlorohydrin or β-epichlorohydrin. However, the obtained anchor coating agents were unsatisfactorily water-proof or moisture-proof for practical use.

Japanese Open Patent Publication No. 50445(1975) also reported quality improvement by using polyepoxy compounds. This adhesive composition consists of a mixture of a polyepoxy compound emulsion with a polyethyleneimine or its derivative. As the reaction products, only the reactants of epichlorohydrin or glycerol diepichlorohydrin with polyethyleneimine derivatives are disclosed. The adhesive composition obtained by the method mentioned in Japanese Patent Publication No. 50445(1975) has disadvantages, i.e. poor storage stability and unstable dilution dispersion stability when used. In addition, Japanese Open Patent Publication No. 119675(1977) reports water-based anchor coating agents which were mixtures or mixed reaction products of a polyethyleneimine with a 1,2-polybutadiene derivative to which epoxy groups are added at the terminals or with 1,2-polybutadiene whose branched vinyl groups are epoxidated. However, this water-based anchor coating agent was insufficient in the qualities such as dilution dispersion stability at use and blocking property at the turn-roller part.

Taking into account the present situations mentioned above, the inventors have attained this invention for the purpose of depeloping water-dispersion adhesives which are very good in storage stability, and have good dilution dispersion stability when used, no blocking property and excellent adhesive physical properties such as moisture-proof or water-proof.

In other words, this invention relates to water-dispersion adhesives for extrusion lamination which comprise a dispersion of resin in water, wherein the resin (A) is obtained from a reaction of a polyepoxy compound (B) with a reaction mixture (C) of a polyethyleneimine (D) and a monoepoxy compound (E).

The polyethyleneimine used in this invention are non-branched or branched polymers having a primary, secondary or tertiary amine group obtained by polymerizing ethyleneimine. They can be used from an arbitrary concentration of the aqueous solution to anhydrous one, for example, 30 weight % (hereinafter % means weight %) aqueous solution of 400–1,000 centipoise (Brook field type viscometer, at 25° C.) in viscosity and pH 8–11 (5% queous solution), or anhydrous polymer of 98–99% and 2–100 poise in viscosity, and its polymers having 200–100,000 of molecular weight.

The monoepoxy compounds used in this invention is one or more compounds selected from the group of (i) the monoepoxy compounds having none of glycidyl ether bond, glycidyl ester bond.

(ii) the monoepoxy compounds having glycidyl ether bond.

(iii) the monoepoxy compounds having glycidyl ester bond.

The monoepoxy compounds of (i) above are represented by the following general formula [A]

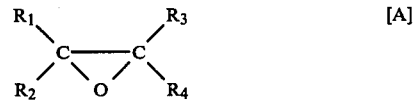

wherein $R_1$ and $R_2$ stand for hydrogen atom or methyl group, and $R_2$ and $R_4$ represent hydrogen atom or an alkyl group having 4–18 carbon atoms.

Representative examples of the monoepoxy compound shown by the formula [A] include butyl ethylene oxide, n-amyl ethylene oxide, isoamyl ethylene oxide, n-hexyl ethylene oxide, isohexyl ethylene oxide, heptyl ethylene oxide, octyl ethylene oxide, n-nonyl ethylene oxide, isodecanyl ethylene oxide, dodecyl ethylene oxide, tridecanoyl ethylene oxide, myristyl ethylene oxide, cetyl ethylene oxide, stearyl ethylene oxide, oleyl ethylene oxide 1-methyl-2-propyl ethylene oxide, octylene oxide, 1-methyl-2-n-amyl ethylene oxide, 1-methyl-1-isopropyl ethylene oxide, 1-methyl-1-isobutyl ethylene oxide, 1-methyl-1-isoamyl ethylene oxide and 1,2-dioctyl ethylene oxide.

The monoepoxy compounds of (ii) above are represented by the following general formula [B]

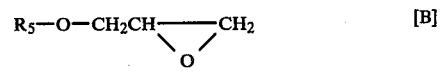

wherein $R_5$ stands for hydrogen atom, an alkyl group having 1–10 carbon atoms, allyl group, methallyl group, phenyl group or a phenyl group substituted by 1 or 2 alkyl groups having 1–8 carbon atoms.

Representative examples of the monoepoxy compounds shown by this formula [B] include glycidol, methyl glycidyl ether, ethyl glycidyl ether, propyl glycidyl ether, allyl glycidyl ether, β-methallyl glycidyl ether, phenyl glycidyl ether, cresyl glycidyl ether, xylyl glycidyl ether, p-butyl phenyl glycidyl ether and p-octyl phenyl glycidyl ether.

The monoepoxy compounds of (iii) above are represented by the following general formula [C]

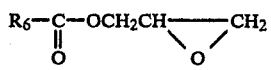

wherein $R_6$ stands for an alkyl group having 1-18 carbon atoms, allyl group, methally group, or phenyl group.

Representative examples of the monoepoxy compounds shown by the formula [C] include acetic acid glycidyl ester, propionic acid glycidyl ester, butyric acid glycidyl ester, caproic acid glycidyl ester, capryl acid glycidyl ester, caproic acid glycidyl ester, lauryl acid glycidyl ester, myristic acid glycidyl ester, palmitic acid glycidyl ester, stearic acid glycidyl ester, oleic acid glycidyl ester, glycidyl ester of tert-carboxylic acid having 8-10 carbon atoms, acryl acid glycidyl ester, methacryl acid glycidyl ester and phenyl acid glycidyl ester.

The monoepoxy compounds (ii) explained by using formula [B] above are preferably used in this invention. More favorable monoepoxy compounds are methyl glycidyl ether, ethyl glycidyl ether, propyl glycidyl ether, butyl glycidyl ether, allyl glycidyl ether and phenyl glycidyl ether.

The polyepoxy compounds employed in this invention are selected from polyepoxy compounds, having two or more epoxy group in a molecule, known as base resin for epoxy resin and having 70–3,500 epoxy equivalent weight selected from the following (1)–(9) groups or the mixture of two or more of those groups:

(1) polyepoxy compounds obtained from bisphenol A and epichlorohydrin or β-methyl epichlorohydrin,
(2) polyepoxy compounds obtained from phenol novolac or o-creosol novolac and epichlorohydrin or β-methyl epichlorohydrin,
(3) resorcin diglycidyl ether,
(4) phthalic or isophthalic acid glycidyl ester,
(5) bisphenol A alkylene oxide (ethylene oxide and/or propylem oxide) adducts, glycidyl ethers,
(6) p-oxybinzoic acid glycidyl ester,
(7) polyepoxy compounds obtained from hydrogenated bisphenol A and epichlorohydrin or β-methyl epichlorohydrin,
(8) polyalkylene glycol diglycidyl ethers and
(9) alicyclic epoxy resin.

The polyepoxy compounds of (1), (7) and (8) above having 130–3,500 epoxy equivalent weight are preferable. More preferable are the polyepoxy compounds obtained from bisphenol A and epichlorohydrin in the group (1) above having the epoxy equivalent weight of 150–3,500.

In this invention, at first, a polyethyleneimine is reacted with a monoepoxy compound to form a reaction mixture (which is simply written as modified PEI hereinafter).

In this invention, the reaction to form the modified PEI is the 1 equivalent weight of primary and/or secondary amine groups in the polyethyleneimine is reacted with 0.1–0.9 preferably 0.4–0.7 equivalent weight of epoxy group in the monoepoxy compound, in the reaction ratio, and the reaction carried out in the solvent (the polyethyleneimine is usually used as an aqueous solution) at 40°–80° C. for 2–6 hours. If less than 0.1 equivalent weight of the monoepoxy compound is used in the above reaction, it becomes difficult to control the next reaction of the modified PEI with the polyepoxy compound. On the contrary, if the amount used exceeds 0.9 equivalent weight, the modifide PEI is unfavorably reacted with the polyepoxy compound in a smaller reaction ratio.

The next reaction of the modified PEI with the polyepoxy compound is that, following the modified PEI forming, 1 equivalent weight of primary and/or secondary amine group in the modified PEI is reacted with 0.05-3, preferably 0.1-2, equivalent weight of the epoxy group in the polyepoxy compound at 30°–80° C. for 1-3 hours. If less than 0.05 equivalent weight of the polyepoxy compound is used in this reaction, excellent improved effects such as moisture-proof and waterproof are scarcely recognized in the adhesives which are obtained from this second reaction mixture by diluting with a proper diluting agent. On the contrary, if the polyepoxy compound is used of more than 3 equivalent weight, the obtained adhesive is unfavorably unstable in storage stability and poor in dilution dispersion stability.

Examples of the solvent employed in the above reaction are those compatible with water such as methyl alcohol, ethyl alcohol, isopropyl alcohol, tert-butyl alcohol, ethylene glycol monomethyl ether, ethylene glycol monoethyl ether, ethylene glycol monobuthyl ether, ethylene glycol monomethyl ether acetate, and dioxane. The amount of the solvent is always adjusted so that the resin content is 10-50% through the reaction process. In this invention, at a proper time during a period after manufacturing and before it is used as an adhesive, a diluting agent such as water only or a mixture of water with a lower alcohol including methyl alcohol or ethyl alcohol and/or other water-soluble solvent is used. The agent is used in amount to make the resin content less than 10%, preferably 0.5-0.3%.

The lower alcohols and water-soluble solvents mentioned above improve wettability on the surface of the base material and effectively accelerate an evaporating rate of the diluting agent after applied. They are used in an arbitrary amount to water.

The water-dispersion adhesives obtained in this invention have such effects as good dispersion and storage stability, and excellent dilution dispersion stability. These water-dispersion adhesives have excellent moisture-proof and water-proof adhesive properties in addition to surpassing warkability with no blocking property at the turn-roller part because of their non-blocking property when used as an water-based anchor coating agent. Thus they are possible to be used in the industry.

The water-dispersion adhesives for extrusion lamination are possible to be utilized for other various purposes, if necessary, by blending a variety of additives such as pigments, organic or inorganic filler, corrosion inhibitor.

Examples of their application are surface-treating agent for glass fiber, inorganic fillers, metal powder, synthic fiber, carbon fiber and carbon black; binders for board, sinters, abrasives and chip form; base resin of printing ink; paints or coating agent for metal or alloys, concrete products and cellulose products; sizing agent for glass fiber, carbon fiber and cellulose fiber; adhesive adding agent for latexes and emulsions; additives for improving aqueous ink dispersibility, curingness and adhesiveness; and adhesives for rubber and natural or synthetic fiber, rubber and plastics, paper and plastic film, flexible container and plywood.

Subsequently, this invention is minutely explained by referring to some Examples and comparative, experimental Examples below, but this invention is not limitely defined by those Examples. Further, all quantities described in those Examples as "parts" or "percent" refer to "parts by weight" or "percent by weight" unless otherwise expressly stated.

EXAMPLE I

Into a reaction vessel were placed 143.3 parts of Epomin P-1000 [Trade name of the product of Japan Catalystic Chemical Induatry Co., Ltd., 30% polyethyleneimine aquous solution having viscosity 400–900 CPS (Brock field type viscometer at 25° C.), PH: 10–11 (5% aqueous solution), molecular weight: about 70,000], 78 parts of buthyl glycidyl ether and 182 parts of ethylene glycol monomethyl ether acetate to react at 50° C. for 6 hours to give a light-yellow and transparent modified PEI solution (S-1). Immediately, into the whole amount of this solution (S-1), 90 parts of Epikote 1001 (Trade name of bisphenol A type epoxy resin produced by Shell Chemical Co., Ltd., epoxy equivalent weight: 450) and 210 parts of ethylene glycol monomethyl ether acetate were added to react at 50° C. for 2 hours. Then, 1,406.6 parts of water was slowly added to give a homogeneous dispersion (I) having resin content of 10%. This dispersion had been stable for more than 6 months in storage.

EXAMPLE II

Into 403.3 parts of the modified PEI solution (S-1) prepared in the same way as Example 1 were added 100 parts of Epoliglt-200E (Trade name of polyalkylene glycol diglycidyl ether type epoxy resin produced by Kyoeisha Yushi Chemical Industry Co., Ltd., epoxy equivalent weight: 200) and 233 parts of ethyl alcohol to react at 40° C. for 1.5 hours. Then, 1,472.6 parts of water was slowly added to give a homogeneous dispersion (II) having resin content of 10%. This dispersion had been stable for more than 6 months in storage.

EXAMPLE III

Into a reaction vessel were placed 143.3 parts of Epomin P-1000 (mentioned above), 79.8 parts of Allyl glycidyl ether and 186.2 parts of ethylene glycol monomethyl ether acetate to react at 50° C. for 6 hours to give a light-yellow and transparent modified PEI solution (S-2). Immediately into the whole amount of this solution (S-2), 82 parts of Epikote 828 (Trade name of bisphenol A type epoxy resin produced by Shell Chemical Co., Ltd., epoxy equivalent weight: 190) and 191.3 parts of ethylene glycol monomethyl ether acetate were added to react at 40° C. for 2 hours. Then, 1,365.2 parts of water was slowly added to give a homogeneous dispersion (III) with resin content of 10%. This dispersion has been stable for more than 6 months in storage.

EXAMPLE IV

Into 409.3 parts of the modified PEI solution (S-2) prepared in the same way as Example 3, 90 parts of Epikote 1004 (Trade name of bisphenol A type epoxy resin produced by Shell Chemical Co., Ltd., epoxy equivalent weight: 900) and 210 parts of ethylene glycol monomethyl ether acetate were added to react at 50° C. for 2 hours. Then, 1,418.6 parts of water was slowly added to give a homogeneous dispersion (IV) having resin content of 10%. This dispersion had been stable for more than 6 months in storage.

EXAMPLE V

Into a reaction vessel were placed 143.3 parts of Epomin P-1000 (mentioned above), 70.4 parts of methyl glycidyl ether, 80 parts of methyl alcohol and 84.6 parts of ethylene glycol monomethyl ether acetate to react at 50° C. for 5 hours to give a light-yellow and transparent modified PEI solution (S-3). Immediately, into the whole amount of this solution (S-3) were added 57 parts of Epikote 828 (mentioned above) and 133 parts of ethylene glycol monomethyl ether acetate to react at 40° C. for 2 hours. Then, 1,136 parts of water was slowly added to give a homogeneous dispersion (V) having resin content of 10%. This dispersion had been stable for more than 6 months in storage.

EXAMPLE VI

Into a reaction vessel were placed 143.3 parts of Epomin P-1000 (mentioned above), 60 parts of phenyl glycidyl ether and 140 parts of ethylene glycol monomethyl ether acetate to react at 50° C. for 8 hours to give a light-yellow and transparent modified PEI solution (S-4). Immediately, into the whole amount of this solution (S-4) were added 95 parts of Epikote 828 (mentioned above) and 221.7 parts of ethylene glycol monomethyl ether acetate to react at 40° C. for 2 hours. Then, 1,320 parts of water was slowly added to give a homogeneous dispersion (VI) having resin content of 10%. This dispersion had been stable for more than 6 months in storage.

EXAMPLE VII

Example 6 was repeated to make the modified PEI solution (S-4) of 343.3 parts. Into this solution (S-4), 104 parts of Epolight-40E (Trade name of polyalkylene glycol diglycidyl ether type epoxy resin produced by Kyoeisha Yushi Chemical Industry Co., Ltd., epoxy equivalent weight: 130) and 242.7 parts of ethyl alcohol were added to react at 40° C. for 2 hours. Then, 1,380 parts of water was slowly added to give a homogeneous dispersion (VII) having resin content of 10%. This dispersion had been stable for more than 6 months in storage.

EXAMPLE VIII

Into a reaction vessel were placed 43 parts of Epomin SP-006 [Trade name of the product of Japan Catalystic Chemical Industry Co., Ltd., anhydrous polyethyleneimine having viscosity 500–2,500 CPS (Brook Field type viscometer at 25° C.), molecular weight: 600], 78 parts of buthyl glycidyl ether and 182 parts of ethylene glycol monomethyl ether acetate to react at 50° C. for 6 hours to give a light-yellow and transparent modified PEI solution (S-5). Immediately, into the whole amount of this solution (S-5), 90 parts of Epikote 1001 (mentioned above) and 210 parts of ethylene glycol monomethyl ether acetate were added to react at 50° C. for 2 hours. Then, 1,506.9 parts of water was slowly added to give a homogeneous dispersion (VIII) having resin content of 10%. This dipsersion had been stable for more than 6 months in storage.

EXAMPLE IX

Into a reaction vessel were placed 143.3 parts of Epomin P-1000 (mentioned above), 82.6 parts of methacryl glycidyl ester, and 192.7 parts of ethylene glycol monomethyl ether acetate to react at 50° C. for 6 hours to give a light-yellow and transparent modified PEI solution (S-6). Immediately, into the whole amount of this solution (S-6), 85.5 part of Epikote 828 (mentioned above) and 199.5 parts of ethylene glycol monomethyl ether acetate were added to react at 40° C. for 1.5 hours.

Then, 1,407.2 parts of water was slowly added to give a homogenous dispersion (IX) having resin content of 10%. This dispersion had been stable for more than 6 months in storage.

COMPARATIVE EXAMPLE I (Adhesive composition A in Example 1 of Japan Open Patent Publication No. 50445/1975).

Epikote 828 (mentioned above) of 50 parts was added to a vigorously stirred solution of which 15 parts of ethylene glycol monomethyl ether acetate and 5 parts an emulsifier (a mixture of a nonyl phenol ethylene oxide adducts, a sorbitan monostearate ethylene oxide adducts, polyethylene glycol, a stearic acid ester and sodium dodecyl benzene sulfonate,) were solved in 30 parts of water to give a emulsion at a concentration of 50% epoxy resin. Into 14 parts of the epoxy resin emulsion mentioned above were added 10 parts of a 30% polyethyleneimine aqueous solution and 76 parts of water and stirred to give a dispersion (X) having resin content of 10%. This dispersion had been stable for more than 12 hours but gave precipitation a few days later.

EXPERIMENTAL EXAMPLE I

The following anchor coating solution (A-I)—(A-X) were adjusted from the dispersion (I)–(X) obtained in Examples I–IX and Comparative Example I, respectively, to test blocking property and dilution dispersion stability.

In order to adjust the anchor coating solution, each dispersion was diluted with a mixed solution of water and methanol at a ratio of 50:50 (weight ratio) to a concentration of 1% of resin content. Polyester film (which is written PET hereinafter) of $15\mu$ in thickness was coated with the anchor coating solution mentioned above with a coating amount of 0.5–0.6 g/m$^2$, dried for 15 minutes at room temperature to evaporate water and solvents in the coating solution. Then aluminum foil of $17\mu$ in thickness was placed on the resulting film and pressure of 500 g/cm$^2$ was exerted on it for 5 seconds in an atmosphere at 40° C. and humidity of 65% RH to test the degree of the blocking property.

In separate test, the dilution dispersion stability of the anchor coating solutions mentioned above was observed with eyes day by day. The anchor coating solution (A-X) was adjusted promptly after the dispersion (X) of the Comparative Example I was adjusted. The test results are shown in Table I.

TABLE I

| No. | Anchor coating solution | Blocking property | Dilution dispersion stability |
|---|---|---|---|
| 1 | A-I | None | Stable more than 3 days |
| 2 | A-II | " | " |
| 3 | A-III | " | " |
| 4 | A-IV | " | " |
| 5 | A-V | " | " |
| 6 | A-VI | " | " |
| 7 | A-VII | " | " |
| 8 | A-VIII | " | " |
| 9 | A-IX | " | " |

TABLE I-continued

| No. | Anchor coating solution | Blocking property | Dilution dispersion stability |
|---|---|---|---|
| 10 | A-X | Yes | Precipitates appeared after 1 hour |

EXPERIMENTAL EXAMPLE II

The anchor coating solution (A-I)–(A-IX) were adjusted in the same way as Experimental Example I from the dispersion (I)–(IX) obtained in Examples I–IX. Adhesive tests were carried out using these solutions.

The anchor cotaing solution was coated on biaxal oriented nylon film of $15\mu$ in thickness at a coating amount of 0.5–0.6 g/m$^2$ to dry for 15 minutes at room temperature to evaporate water and the solvents in the coating solution. On the resulting film was placed low-pressure polyethylene film of $150\mu$ in thickness to press with hot for 10 seconds at 200° C. and 20 kg/cm$^2$ by heat seal tester to form a laminated film test piece.

Ordinary and water-proof adhesive strength of the test pieces mentioned above were measured by Instron type tester at an stretching rate at 100 mm/min. The results are shown in Table II.

TABLE II

| | | Adhesive strength (g/15 mm) | |
|---|---|---|---|
| No. | Anchor coating solution | Ordinary state (Note 2) | Water-proof (Note 3) |
| 1 | A-I | 450 | 450 |
| 2 | A-II | 450 | 400 |
| 3 | A-III | 400 | 400 |
| 4 | A-IV | 450 | 400 |
| 5 | A-V | 400 | 350 |
| 6 | A-VI | 400 | 400 |
| 7 | A-VII | 400 | 350 |
| 8 | A-VIII | 450 | 400 |
| 9 | A-IX | 400 | 380 |
| 10 | A-PEI (Note 1) | 250 | 50 |

(Note 1): Epomin P-1000 (mentioned above), 1% aqueous solution.
(Note 2): Laminated film was measured after cured for 2 days at 25° C. and 65% RH.
(Note 3): Laminated film was cured for 2 days at 25° C. and 65% RH, then immersed in water for 24 hours at 20° C. to measure.

EXPERIMENTAL EXAMPLES III

An anchor coating solution (A-I) or (A-III) was adjusted in the same way as Experimental Example I from the dispersion (I) or (III) obtained in Example I or III, respectively. This solution was used to laminate polyethylene on various base materials by melting extrusion in the in-line method by a melt-extrusion laminate machine (laminating rate: 80 m/min, and melt-extruded resin temperature: 300° C.) to form composite film.

Various adhesive tests and tests of blocking property of the base materials applied the anchor coating solution at the turn-roller part during laminating were implemented on these composite films obtained. The results are shown in Table III.

Composite films such as those are cut in a proper size to form bags and practically used as a wrapping material for food, agricultural and pharmaceuticals.

TABLE III

| No. | Anchor coating solution | Test item | | Base material (Note 5) | | | | | |
|---|---|---|---|---|---|---|---|---|---|
| | | | | NY | PET | OPP | KNY | PT | AL |
| 1 | A-I | Adhesive strength (g/15 mm) | Ordinary state (Note 2) | 400 | 300 | 250 | 250 | 300 | 300 |
| | | | Moisture-proof (Note 4) | 400 | 300 | 250 | 250 | 250 | 300 |
| | | | Water-proof (Note 3) | 400 | 300 | 250 | 250 | 200 | 250 |

TABLE III-continued

| No. | Anchor coating solution | | Test item | Base material (Note 5) | | | | | |
|---|---|---|---|---|---|---|---|---|---|
| | | | | NY | PET | OPP | KNY | PT | AL |
| 2 | A-III | Adhesive strength (g/15 mm) | Blocking property | None | None | None | None | None | None |
| | | | Ordinary state (Note 2) | 350 | 300 | 250 | 250 | 250 | 300 |
| | | | Moisture-proof (Note 4) | 350 | 300 | 250 | 250 | 250 | 300 |
| | | | Water-proof (Note 3) | 350 | 300 | 250 | 250 | 150 | 250 |
| 3 | A-PEI (Note 1) | Adhesive strength (g/15 mm) | Blocking property | None | None | None | None | None | None |
| | | | Ordinary state (Note 2) | — | — | 250 | — | 300 | — |
| | | | Moisture-proof (Note 4) | — | — | 200 | — | 150 | — |
| | | | Water-proof (Note 3) | — | — | 50 | — | 0 | — |
| | | | Blocking property | — | — | None | — | None | — |

(Note 1) - (Note 3): Mentioned above (in Table II)
(Note 4): Laminated film was cured for 2 days at 25° C. and 65% RH followed by leaving it in an adjusted-moisture atmosphere of 90% RH at 40° C. for 24 hours to measure.
(Note 5):
NY: Biaxial oriented nylon
PET: Polyester
OPP: Biaxial oriented polypropylene
KNY: Biaxial oriented nylon coated with polyvinyliden chloride
PT: plain cellophane
AL: Aluminum foil

What is claimed is:

1. Water-dispersion adhesives for extrusion lamination which comprise a dispersion of a resin in water, wherein the resin (A) is obtained from a reaction of a polyepoxy compound (B) with a reaction mixture (C) of a polyethyleneimine (D) and a monoepoxy compound (E).

2. Water-dispersion adhesives according to claim 1 in which the polyethyleneimine is 200 to 100,000 in molecular weight.

3. Water-dispersion adhesives according to claim 1 in which the monoepoxy compound is represented by the following formula

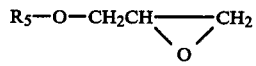

wherein $R_5$ stands for hydrogen atom, an alkyl group having 1–10 carbon atoms, allyl group, methallyl group, phenyl group or a phenyl group substituted by 1 or 2 alkyl groups having 1–8 carbon atom.

4. Water-dispersion adhesives according to claim 1 in which the monoepoxy compound is represented by the following formula

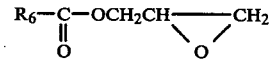

wherein $R_6$ stands for an alkyl group having 1–18 carbon atoms, allyl group, methallyl group, or phenyl group.

5. Water-dispersion adhesives according to claim 1 in which the polyepoxy compound is diglycidyl ethers obtained from bisphenol A and epichlorohydrin or from bisphenol A and β-methyl epichlorohydrin.

6. Water-dispersion adhesives according to claim 1 in which the polyepoxy compound is a polyalkylene glycol diglycidyl ether.

7. Water-dispersion adhesives according to claim 1 in which the reaction mixture (C) is obtained from a reaction of a monoepoxy compound (E) having 0.1–0.9 equivalent weight of epoxy group with polyethyleneimine (D) having 1 equivalent weight of primary and/or secondary amine groups and the resin (A) is obtained from a reaction of a polyepoxy compound (B) having 0.05–3.0 equivalent weight with the reaction mixture (C) having 1 equivalent weight of primary and/or secondary amine groups.

* * * * *